United States Patent
Needham et al.

(10) Patent No.: US 12,372,598 B2
(45) Date of Patent: Jul. 29, 2025

(54) SYSTEMS AND METHODS FOR SENSING ENVIRONMENTAL CONDITIONS SURROUNDING PHOTOVOLTAIC SYSTEMS

(71) Applicant: AVSensor, LLC, Mont Vernon, NH (US)

(72) Inventors: Christopher Thomas Needham, Mountain View, HI (US); Frank Carl Oudheusden, Mont Vernon, NH (US)

(73) Assignee: AVSENSOR, LLC, Mont Vernon, NH (US)

( * ) Notice: Subject to any disclaimer, the term of this patent is extended or adjusted under 35 U.S.C. 154(b) by 0 days.

(21) Appl. No.: 19/001,271

(22) Filed: Dec. 24, 2024

(65) Prior Publication Data

US 2025/0216496 A1 Jul. 3, 2025

Related U.S. Application Data

(60) Provisional application No. 63/616,438, filed on Dec. 29, 2023.

(51) Int. Cl.
*G01S 3/78* (2006.01)
*G01S 3/786* (2006.01)

(52) U.S. Cl.
CPC .......... *G01S 3/7803* (2013.01); *G01S 3/7861* (2013.01)

(58) Field of Classification Search
CPC ... G01S 3/7803; G01S 3/7861; G06Q 10/063; G06Q 10/20; G06Q 50/10; G01R 31/34; G01R 31/343; G01R 22/06; G01R 31/00; G01R 31/367; G01R 31/3842; G01R 31/392; G01R 31/11; G01W 1/10; G01W 1/02

See application file for complete search history.

(56) References Cited

U.S. PATENT DOCUMENTS

| | | | |
|---|---|---|---|
| 8,400,134 B2 * | 3/2013 | Moussaoui | H10F 77/955 323/299 |
| 2020/0274357 A1 * | 8/2020 | Inoue | H02J 3/16 |
| 2022/0060017 A1 * | 2/2022 | Lewin | H02J 3/003 |
| 2022/0129018 A1 * | 4/2022 | Needham | H02S 20/32 |
| 2022/0268801 A1 * | 8/2022 | Needham | H02S 50/00 |

* cited by examiner

*Primary Examiner* — Alvaro E Fortich
(74) *Attorney, Agent, or Firm* — PERKINS COIE LLP; Colin Fowler; Ben Brokesh

(57) ABSTRACT

Sensors are installed on a solar photovoltaic (PV) tracker project to monitor the movement of solar PV trackers, primarily under wind loading but also during normal tracking operation. The monitoring establishes a baseline performance of the system. Once this baseline is established, the system is monitored for any deviation from the baseline to provide early warning of developing issues before significant failures are experience under environmental loading. The system can also provide real-time measurement of wind speeds throughout the project, based on the baseline performance characterization.

20 Claims, 12 Drawing Sheets

SYSTEMS AND METHODS FOR SENSING ENVIRONMENTAL CONDITIONS SURROUNDING PHOTOVOLTAIC SYSTEMS

TECHNICAL FIELD

This disclosure relates generally to photovoltaic systems and in particular to monitoring of environmental conditions around a photovoltaic system.

BACKGROUND

Solar photovoltaic (PV) projects are often installed on single-axis trackers (SAT) in order to increase and broaden the energy yield over the day. These systems rely on following the sun angle in order to achieve this effect. However, rotating the system in this way introduces a variable loading on components that can lead to self-loosening of fasteners or other unexpected wear patterns. Additionally, the design requirements of rotation make the tracker structure susceptible to environmental loadings such as wind, snow, seismic, hail, or ice loading, and these can cause failures of systems over time if they are not carefully monitored and if issues are not addressed in a timely manner.

The current method of monitoring the mechanical condition of a solar PV tracker is to perform routine, typically annual, spot-checks of fastener torque as well as a general visual inspection of the system. Since solar projects typically use many rows of the same design and rows are subjected to similar environmental loading, spot-checking is statistically likely to find some issues as the number of issues per project increases. For example, module hardware is likely to be found loose at many locations if self-loosening is an issue on a project such that spot-checking even a few percent of module fasteners will identify the problem. For that reason, spot-checking as few as 5% of rows is done to identify certain types of common issues before failures occur.

As trackers have generally become more highly engineered over time, they have become more dependent on operating within a minimum set of critical parameters. Some examples of these parameters include damper performance, bushing friction, slip-critical joint performance, and resilience against aerodynamic and aeroelastic effects. Unfortunately, none of these key factors is optimally monitored through the current methods and so there are key failure modes that can develop over time on a tracker system that are not identified until after significant failures under environmental loading have occurred. There is a need from operations and maintenance (O&M) professionals.in the solar PV tracker market for a method of identifying these issues before they result in significant failures

DETAILED DESCRIPTION

Figure 1:
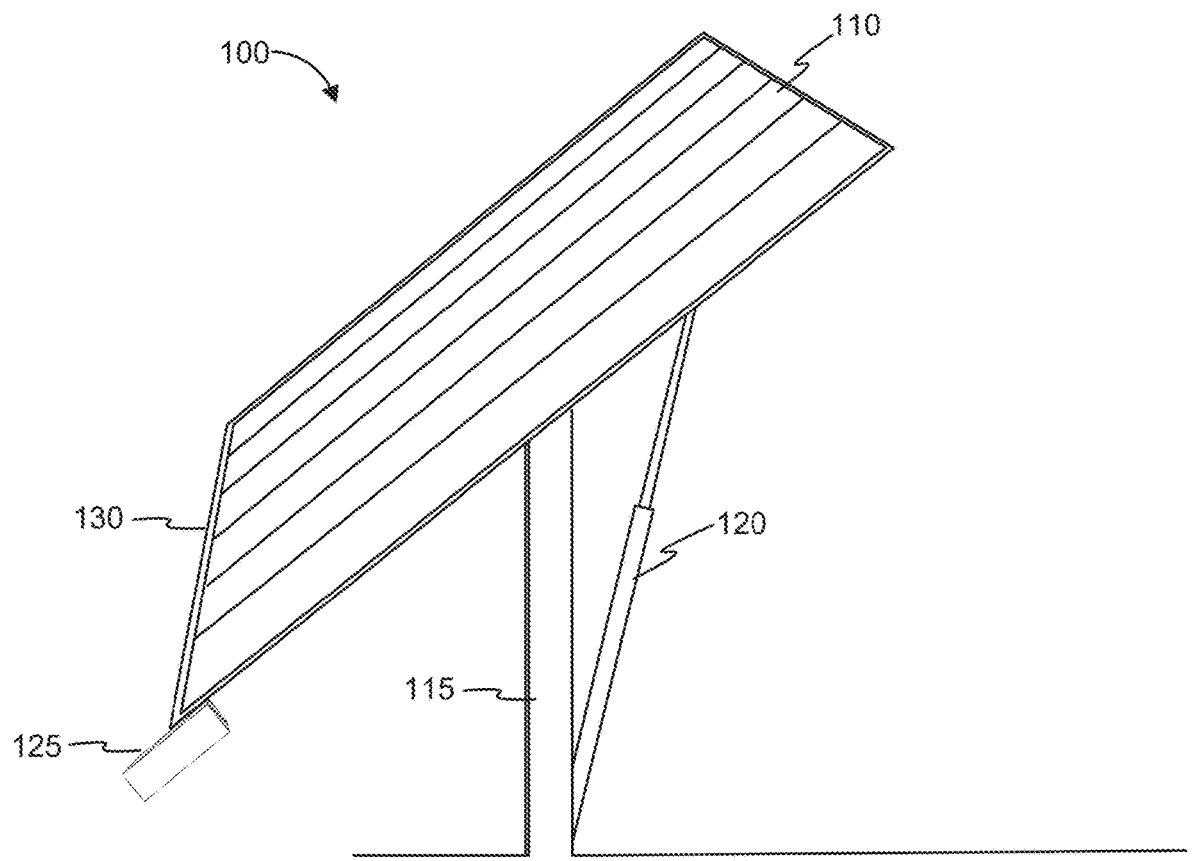
FIG. 1 illustrates a PV module with a sensor attached.

Cross-referencing varied styles/types of sensor data associated with a photovoltaic (PV) power system enables remote diagnosis of different styles of failure modes. Similarly, solar panel, purlin-mounted, or PV tracker system mounted position sensors enable construction of behavior models over time that similarly enables failure mode diagnosis. Failure mode diagnosis enables remote re-creation of wind events without having a witness present and identifies maintenance issues before those issues become critical.

PV power systems frequently track the sun to various degrees to increase an amount of energy produced by the system. These trackers typically move PV modules to adjust an angle of incidence of the sunlight on the surface of the PV modules. In particular, trackers typically rotate the PV modules around an axis principally oriented north to south, tilting the modules to as much as 60 degrees toward the east and west and adjusting tilt within this range throughout the day. By tracking the position of the sun, PV power systems often produce 20%-30% more energy than fixed-tilt systems.

A common configuration of horizontal SAT as described above includes a single actuator near the center of a row of PV modules, potentially with 80-120 modules tilted by a single actuator. The angle of tilt is defined by the position of the actuator, while a torque tube or other similar device transfers moments and positions to the rest of the row at the tilt of the actuator. However, environmental loading (wind, snow, dead load, etc.) can twist portions of a row away from the intended tilt angle. These types of solar trackers are referred to as "flexible" within the industry in comparison to types that use an actuator on sufficient points along a solar tracker row to constrain maximum twist to less than 10 degrees delta measured along a given row. Solar trackers that exhibit meaningful twisting under wind loading require that both static and dynamic impacts be considered through wind tunnel testing. The combination of static and dynamic wind loading results in a total system wind loading. The twisting is typical of other types of flexible structures that deform under wind loading and is well studied in the industry through aeroelastic wind tunnel testing and related simulation modeling.

Flexible PV systems generally rely on as few actuators as possible (actuators are comparatively expensive parts). The ratio of actuators to panels is higher than in non-flexible systems. Non-flexible systems use more actuators in place of increased damping or more superstructure steel; however, the additional actuators increase the overall cost of the system.

For purposes of this disclosure, a "flexible" solar tracker system is one subject to sufficient deflection as to require aeroelastic consideration. Ten degrees of absolute twist is a typical cutoff for when a static wind tunnel test report may be used without specific aeroelastic testing added in. However, the selection of 10 degrees of absolute twist is subjective on the part of the wind tunnel test facilities and allows for a buffer when aeroelastic effects begin to dominate. Flexible tracker systems allow for deflection requiring aeroelastic consideration due to a relative lack of points of fixity along each row. Actuators generally act as points of fixity. Rows that have few (or a single) actuator or other point of fixity per panel/module are flexible.

PV systems experience catastrophic failures due to wind events. These failures cause portions of the PV system to be destroyed by deforming the PV panels and/or the support structure. In an increasing number of cases, PV systems are failing under moderate wind conditions that are less than the design wind load. These PV systems are typically failing due to aeroelastic responses from wind exposure. The failure typically arises from rotational oscillation about the rotation axis of the PV panel.

The systems and methods described herein teach monitoring solar PV system performance when trackers are used on a project. A number of sensors are distributed over a site such that deflection of the rows (e.g., rotational movement and position (tilt)) is monitored. Monitoring by sensors is performed through any of numerous different styles of sensors including inclinometers, accelerometers, strain gauges, cameras, or any other method of determining rotational movement and position of the monitored tracker rows. In some embodiments, these sensors are mounted physically to a row or are separately mounted (in the case of the camera, for example) as is appropriate to provide measurement. As with the current spot-checking method, overall site performance can be determined through actively monitoring a subset of the tracker rows' performance. Embodiments of visual monitoring (e.g., with cameras) include placement of the camera with a view of a particular tracker array being monitored or positioned with a greater field of view and observing multiple rows.

Sensors monitor tracker rows to determine rotational motion under wind loading, relative to an intended tracker tilt angle as set by the tracker controller and actuators. Relative to the intended tracker angle, tracker motion can be categorized according to amplitude and/or frequency. The rotational motion may be cyclical if the row behavior shows an oscillation or it may be simply a twist deviation from intended tracker tilt angle. The reasoning for a mismatch to an intended angle can be further classified as a function of intended tracker tilt angle, site wind velocity (direction+speed), tracker row configuration, and tracker row location. In some embodiments, other metrics are relevant to categorize frequency and amplitude against. Once a categorization baseline is determined, deviation from the baseline is used to identify a change in operating state and flag a row for inspection. In some embodiments, machine learning or AI is employed in creating the baseline and in interpreting the meaning of deviations.

Monitoring tracker row rotation frequency and amplitude under various site wind speeds and directions (wind velocity) enables identification of key failure modes before significant damage occurs. For example, an increase in amplitude and frequency for a given wind velocity would indicate lower total system damping and flag inspection of dampers for failure. A decrease in amplitude and/or frequency would represent higher total system damping, which could indicate stuck dampers, increased bushing friction, or physical obstructions such as snow/ice loading. A deviation of tracker tilt angle from the intended operating angle could indicate increased friction, loose connections (introducing slop), or the presence of unexpected loading such as unbalanced snow on the panels. Under teachings herein, a person skilled in the art of tracker design will understand that many variations of changes in row frequency, amplitude, or the characteristics of monitored sensor readings such as the smoothness of sensor readings are indicative of other potential failure modes before significant failures occur on-site.

In a given example, a consideration of how smooth accelerometer data readings are identifies loose connections. Where data presents a sinusoidal shape in accelerometer data, a monitoring system makes an inference that all is well; conversely, sharp and repetitive "peak" accelerations are indicative of loose connections that suddenly take up slack on every oscillation.

Monitored rows are compared against other rows on a site to establish the baseline performance of the system. A deviation from this baseline for either frequency or amplitude enables identification of issues prior to significant failures in the same manner as creating the baseline performance characterization solely off a single row. A person skilled in the art will recognize that any number of rows can be used in this manner to develop a baseline performance characterization and to interpret deviations.

Monitoring tracker row rotation frequency and amplitude may also be used to indicate local wind speeds at each monitored row location. For example, amplitude is expected to increase with local wind speed for a given tracker tilt angle and wind direction while frequency may decrease at the same time for higher damped systems. This function is specific for each monitored location and can be established through the same baseline process as with monitoring for overall site performance. By timestamping the local wind speeds recorded through this method, a higher fidelity of wind speeds over a site can be achieved than through a few anemometers on a site as is the current method. Monitoring both performance and local wind speeds at each location and timestamping each enables identification of when failures occur. Failure timestamping is valuable information when performing a post-mortem analysis on a site after failures have occurred.

Based on the above timestamping, the data enables generation of a "wind map." This approach at generating a wind map uses just one measurement of peak amplitude/frequency instead of timestamping multiple measurements to try to determine the wind gust velocity. The method therefore requires knowing the site wind direction to determine wind speed (wind speed~tracker rotation amplitude for a given wind direction and tilt angle).

Another method of monitoring system performance is through the use of pressure sensors located throughout the array. In a similar manner that sensors that measure amplitude and/or frequency are baselined against wind velocity and other metrics, the pressure sensors are baselined to characterize each pressure sensor. Through this method, the pressure sensors are monitored to provide local wind speed measurements as a function of at least the site wind direction.

In some embodiments, the pressure tap is part of a distributed sensor network that is correlated to tracker row tilt angle, site wind speed, and site wind approach direction. Employing a three-variable map (generated by measuring the pressure tap over time versus known wind speed/direction and tilt angle), a model generates a wind map at a more granular level. In this embodiment, the wind map need not timestamp sensors against each other. Further, a single sensor suite (on one module or row) is sufficient for wind map generation. Rather, the pressure data timestamps the pressure data and compares against changes in frequency from simpler described embodiments to estimate failure wind speeds, etc. In some embodiments, the sensor suite correlates sensor pressure readings with accelerometer readings as a method of determining local wind speeds.

To baseline the pressure sensor: pressure is a function of: site wind speed, direction, and system tilt angle. Once baselined, determining local wind speed uses: pressure reading, site wind direction, and tilt angle.

FIG. 1 illustrates one embodiment 100 of an accelerometer sensor 125 mounted on a PV panel or purlin 110. The PV panel 110 is supported by a base 115. The angle of tilt of the PV panel 110 is adjusted by an actuator 120 that is coupled to the base 115 and the PV panel 110. The accelerometer sensor 125 is mounted on an edge 130 of the PV panel 110. The accelerometer sensor 125 is mounted on the edge 130 so that an additional small PV panel that is part of the accelerometer sensor and powers the accelerometer sensor 125 is exposed to the sunlight. Mounting the accelerometer sensor 125 on the edge 130 is also advantageous because the PV panel 110 experiences greater movement at points farther from the base 115. Thus, the accelerometer sensor 125 can read maximum movement of the PV panel 110 and reduce the rate of error in the collected data. In some embodiments, the sensor 125 is mounted on a purlin or other location on the PV tracker system.

In some embodiments, a solar panel is integrated into the bottom of the sensor 125, facing toward the ground (e.g., not at the direct sunlight). Given the low operational time of the sensor 125, it is possible that diffuse or reflected light is enough to power the sensor 125. The sensor 125 typically operates in low power mode and wakes only to take intermittent samples and then fully awake during the big storms.

Figure 2:
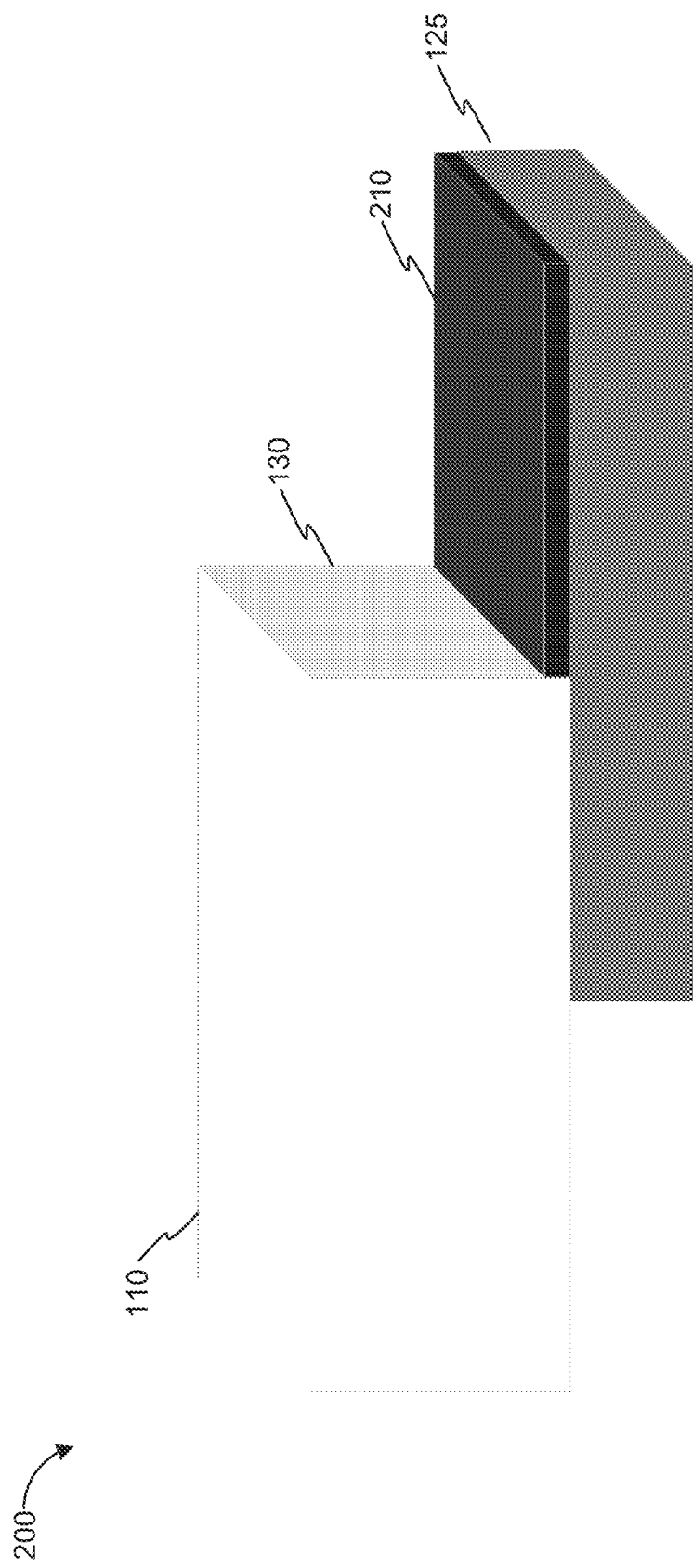
FIG. 2 is a detail view of a sensor on a PV panel.

FIG. 2 illustrates an orthogonal view 200 of the accelerometer sensor 125 on the PV panel 110. The accelerometer sensor 125 is installed on the bottom of the PV panel 110 so that the accelerometer sensor 125 does not shade the PV panel 110. A portion of the accelerometer sensor 125 extends beyond the edge 130 of the PV panel 110. A small sensor PV panel 210 is mounted on the upper side of the sensor 125. The sensor PV panel 210 is oriented in the same direction as the PV panel 110 so that the sensor PV panel 210 collects sunlight at the same time as the PV panel 110. The sensor PV panel 210 powers the accelerometer sensor 125. The sensor PV panel 210 collects energy independently of the PV panel 110 itself. Using an independent sensor PV panel 210 allows the accelerometer sensor 125 to operate independently of the PV panel 210 power system.

The accelerometer sensor 125 consists of at least an accelerometer. The accelerometer directly measures PV panel 110 movement. Since accelerometers are relatively inexpensive, many more accelerometers are used across a PV power plant site. Accelerometer data across the site can be used to determine wind speed and duration of gusts. The collected data is timestamped. By correlating data from a number of accelerometers, the direction of the wind, the speed of the wind, and the duration of gusts can be determined across the site. Additionally, the data can be used to determine which panels are experiencing the most movement from the wind and to predict which panels are most likely to experience larger wind loads. Accelerometer sensors 125 may also include a Wi-Fi repeater and a battery. The Wi-Fi repeater creates a mesh network on the site with other accelerometer sensors 125 with Wi-Fi repeaters. The battery is capable of being charged by the sensor PV panel and providing power to the accelerometer and Wi-Fi repeater during nighttime and low light conditions. The accelerometer sensor includes a power module. The power module provides maximum power point tracking, battery charging/discharging, and regulated power supply for an Internet-of-Things (IoT) platform.

Figure 3:
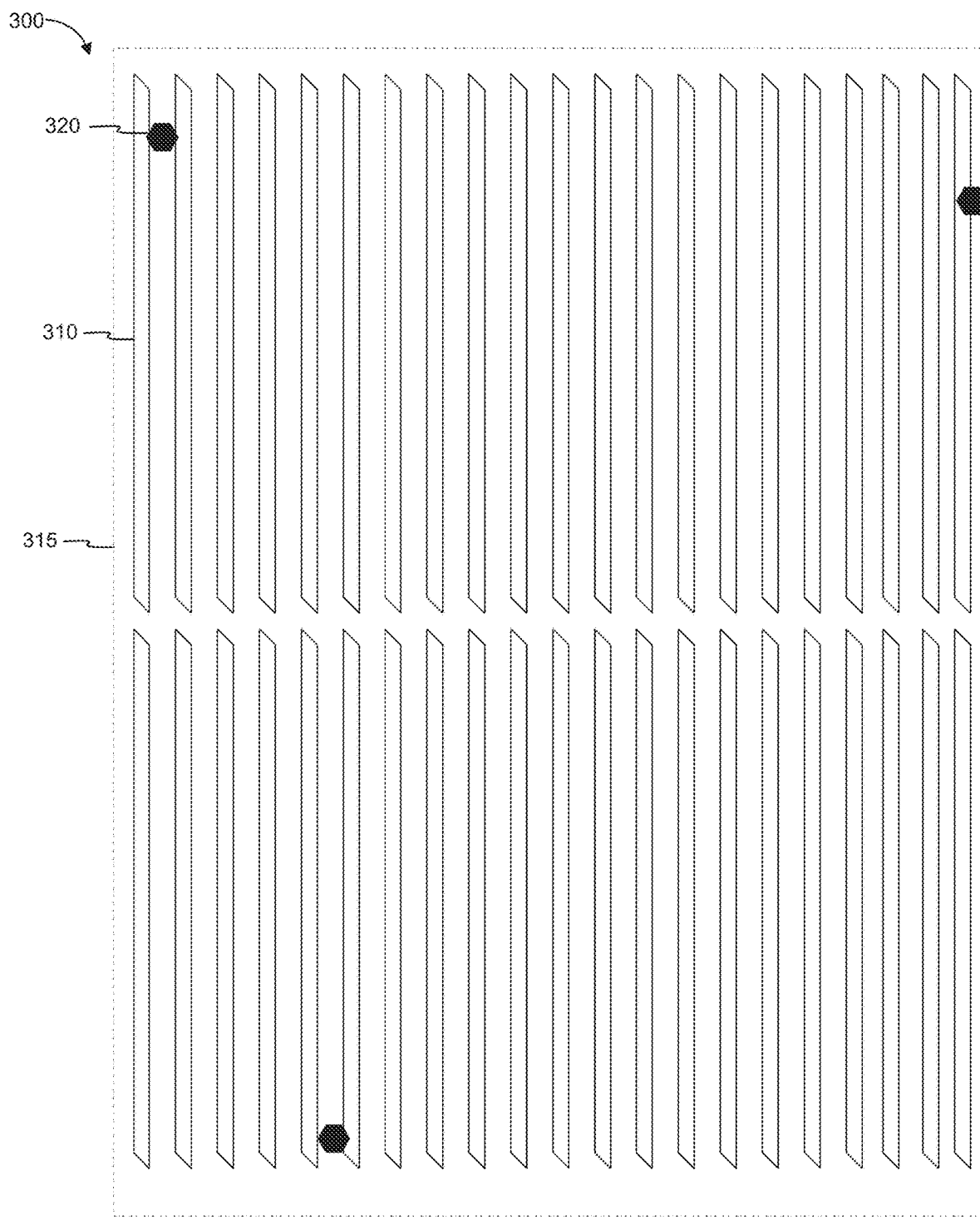
FIG. 3 illustrates a PV power project site with anemometers.

FIG. 3 illustrates an example of placement of anemometers 320 on the PV power plant site 300. Here, three anemometers 320 are shown along the edges of the PV power plant site 300. The anemometers 320 are distributed among the PV panels 310 in the array. The PV power plant site 300 is bounded by a property boundary 315. Only three anemometers 320 are possible on a large site due to their expense and other limiting factors.

Figure 4:
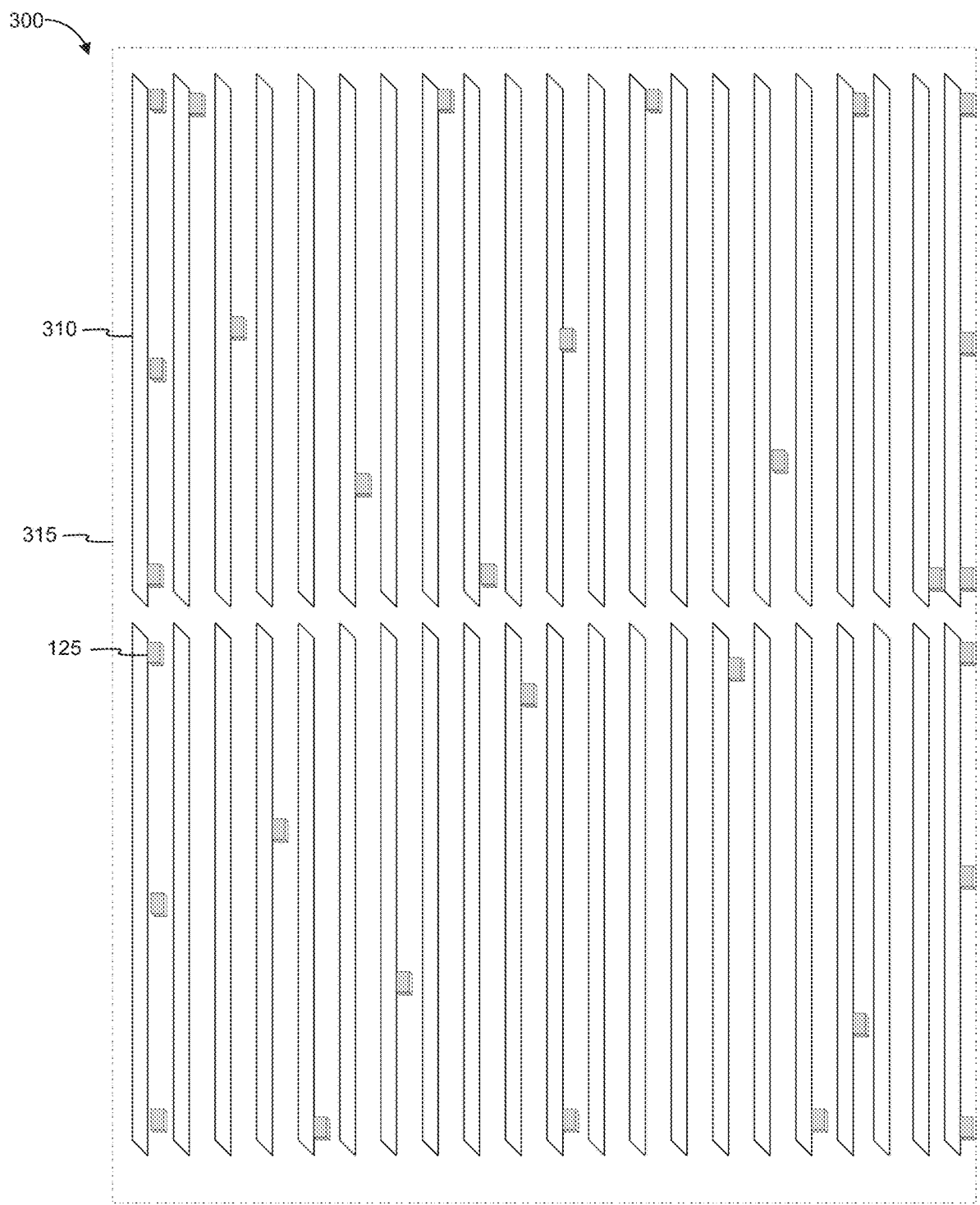
FIG. 4 illustrates a PV power project site with sensors.

FIG. 4 illustrates example placement of positional sensors 125 on the same PV power plant site 300. A positional sensor 125 refers to a sensor that communicates a position or motion of the sensor such as an accelerometer or an inclinometer. The positional sensors 125 are distributed across the PV power plant site 300. The number of positional sensors 125 is significantly greater than the number of anemometers 320 in FIG. 3. The positional sensors 125 are distributed so that additional positional sensors 125 are located toward the edges of the PV power plant site 300 and fewer are placed in the middle. The placement targets the portions of the PV array that are likely to aeroelastically deflect the most. The edges of a flexible system are the furthest away from a point of fixity (e.g., the actuator), which is typically in the center of each row.

This does not preclude evenly distributing the positional sensors 125 across the PV power plant site 300. PV panels 310 on the edges of the PV power plant site 300 are more likely to experience higher wind loads, so additional positional sensors 125 at the edges of the PV power plant site 300 can collect data at critical locations. PV panels 310 in the center of the row are comparatively fixed based on linkage to a point of fixity (e.g., the actuator). Further, PV panels 310 in the middle of the site are shielded by the PV panels 310 on the edge of the PV power plant site 300, if the PV power plant site 300 is relatively flat.

While positional sensors 125 positioned in relatively shielded areas should have lower acceleration vectors, the expected difference can be used as a further point for wind analysis. That is, where the difference between the sensors near points of fixity and near row edges is great, the controller is enabled to conclude that the environmental conditions (also referred to herein as "weather conditions") are dangerous to continued operation.

Site topography may be such that different portions of the PV power plant site 300 are more likely to experience higher wind loads than others. For example, the center of the PV power plant site 300 may be at the top of a hill and the edges of the PV power plant site 300 may be located down in a valley. The area at the top of the hill would be less protected by the surrounding topography so it may experience greater wind loads. An increased number of accelerometer sensors 125 may be placed at the top of the hill to more accurately measure the wind load. Fewer positional sensors 125 may be placed at the lower elevations because the wind load may be less intense at the lower elevation.

Positional sensors 125 can be placed at many locations across the PV power plant site 300 no matter the expected wind loading at each location because the PV panels 110 may move into a stowed position at different times depending on the wind loading experienced at that particular location.

Saturation of positional sensors 125 varies from power plant site 300 to site 300. Once a predetermined density threshold of positional sensors 125 is met, there is diminishing returns on the addition of additional sensors 125. In this case, sensor density takes into account sensors per row as well as sensors per row edge, sensors per row center, sensors per site edge, and sensors per site center.

An upper tolerance for movement in the PV panels 110 can be preset. Then, when a specific panel reaches the upper limit of acceptable movement, the PV panel 110 is moved into a stow position to reduce damage to the PV panel 110. The stow position is a safer position for the PV panel 110 that reduces damage to the PV panel 110. Additionally, an upper tolerance for measured vibratory motion in the PV panel 110 can be preset. One end state of this motion can be flutter, which is when the PV panel 110 moves in a cyclical manner due to wind loading. The flutter can be caused by an improper operating state of the PV system. Flutter can be a precursor to PV panel 110 failure. If the positional sensor 125 detects PV panel movement at or above the upper tolerance for flutter onset conditions, then the PV panel 110 is moved into a stow position to reduce damage to the PV panel 110.

PV panels also fail from buffeting and from not entering a wind stow configuration early enough. Buffeting is a vibratory failure mode that is typically caused by shed vortices/turbulence within a PV array. Buffeting is generally a vibration in-plane with the panels rather than an oscillation about the center of rotation. The PV system is designed to enter the wind stow configuration prior to experiencing design wind loads; if the PV system does not enter the protected wind stow configuration, it can fail.

PV panels 110 can be moved to a stow position with more accuracy and granularity because of the number of positional sensors 125. As a positional sensor 125 detects movement that indicates that the PV panel 110 will be damaged, then the PV panels 110 in the immediate vicinity of the positional sensor 125 are stowed. If other positional sensors 125 are not observing such large movement magnitudes, then the PV panels 110 in the vicinity of those positional sensors 125 can be left in the operating position and continue to collect the maximum amount of sunlight. The additional data and ability to measure movement of many different PV panels 110 allow the system to stow with greater accuracy. The system can stow vulnerable tracker units and leave more shielded tracker units in position, thus increasing their operating time and overall site energy yield.

Another benefit of directly measuring the movement of the PV panel 110 is that more is understood about the conditions around the PV panel 110 before failure. Data from positional sensors 125 and other sensors is recorded as it is collected and then referenced after the failure. This data could show whether or not there was unintentional movement of the PV panel 110, if the PV panel 110 was responding in a manner not consistent with its design, or if there were high gusting winds, snow drifts or other unusual conditions prior to failure.

In addition to a positional sensor 125, the site may include additional sensors to observe environmental conditions surrounding the PV system and to improve PV system performance. Additional sensors may include but are not limited to a snow detection sensor such as an ultrasonic or laser sensor. Snow detection sensors reduce the risk of trackers moving into an unknown snowbank or the snowbank reducing sunlight collection or damaging the tracker. The snowbank has been created by a snow drift on the site. A stress/strain sensor is for determining the structural load induced on the structural members. On-site security cameras provide remote visual access to the site for monitoring the site from one or more points of view. An irradiance sensor is for measuring the rate at which solar energy falls onto a surface. A soiling measurement sensor is for measuring the soiling effects on the PV panels and determining the amount of soiling versus a determined non-soiled baseline. A humidity sensor is for measuring the humidity in the ambient air. A temperature sensor or thermometer is for measuring the device or ambient air temperature.

Figure 5:
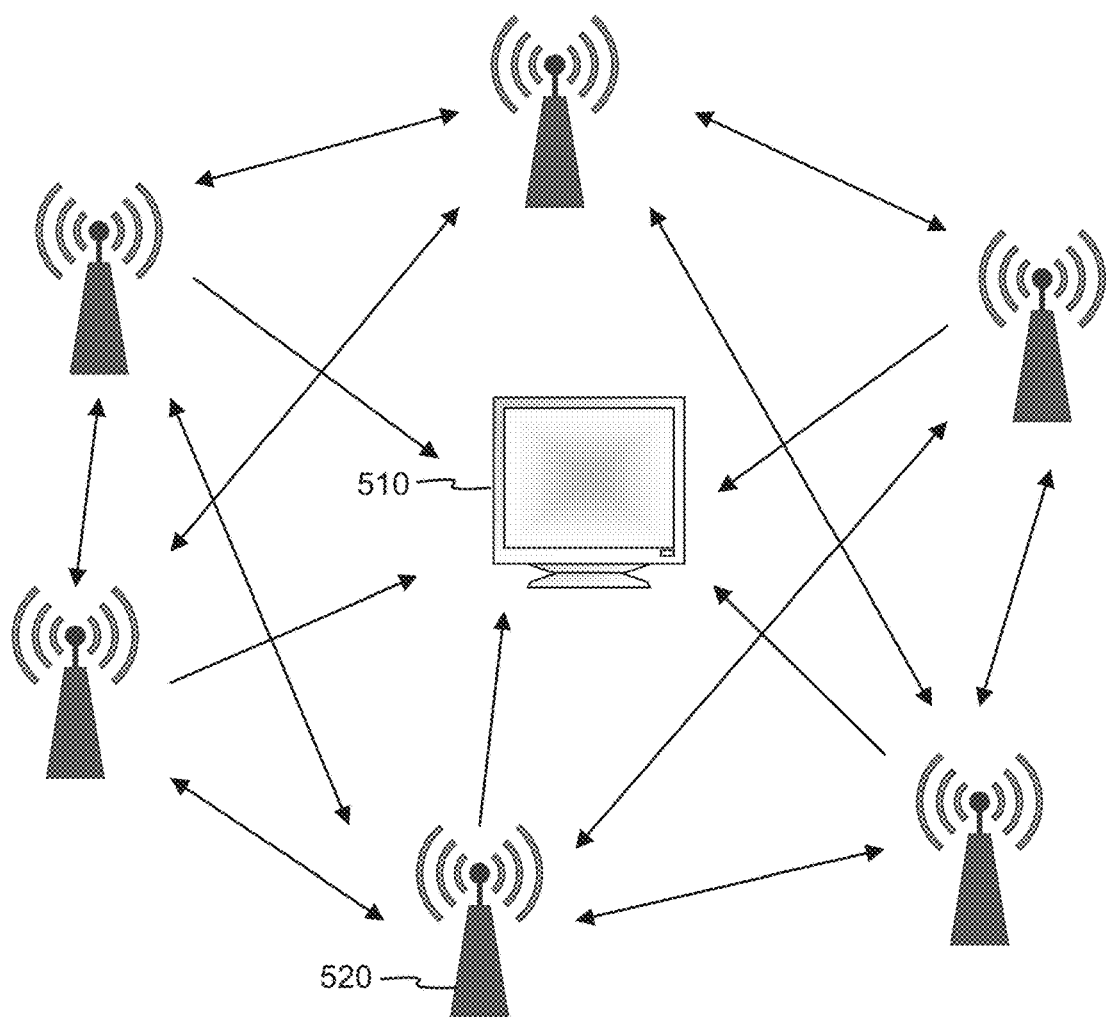
FIG. 5 illustrates sensor communication with a central computing environment.

FIG. 5 illustrates sensors 520 (sensors including accelerometers, inclinometers, snow detection sensors, stress/strain sensors, on-site security cameras, irradiance sensors, soiling measurement sensors, humidity sensors, temperature sensors, and any other sensor that observes on-site environmental conditions or improves PV panel function) communicating with a central computing system 510. Each sensor 520 is enabled to transmit a signal, either through a wired or a wireless connection. The signal transmitted consists of the positional data and data obtained from any other sensing device that is included within the sensor apparatus 520. The central computing system 510 is located on- or off-site so that the central computing system 510 can receive data transmissions from the sensors 520 at all times. A sensor 520 may not include an accelerometer. Sensors 520 that do not include an accelerometer have the ability to communicate with the central computing system 510 whether through wired or wireless transmission.

Using a central computing system 510, conclusions about environmental conditions can be drawn from the collected sensor 520 data. The data is correlated across multiple positional sensors 125. Multiple positional sensors 125 show which direction the wind is moving by showing which positional sensor 125 records movement during a specific time period. The peak magnitude and the timestamp measured by the sensors 125 can indicate the direction the wind is blowing and the magnitude of the gusts after that data is correlated across a collection of positional sensors 125. First, a sufficient amount of data from the sensors 125 must be collected, in particular recording peak magnitude of each positional sensor and the timestamp. Second, that data must be correlated with wind activity. Third, the positional data must be correlated with the PV panels' reaction to the wind events.

The meaning of "magnitude" varies based on the sensor used. With an accelerometer, magnitude is a component of the data. If an inclinometer is used, acceleration is derivable by a rate of change in sensor output. Thus, over multiple sensor readings of an inclinometer, one is able to derive a magnitude.

Figure 6:
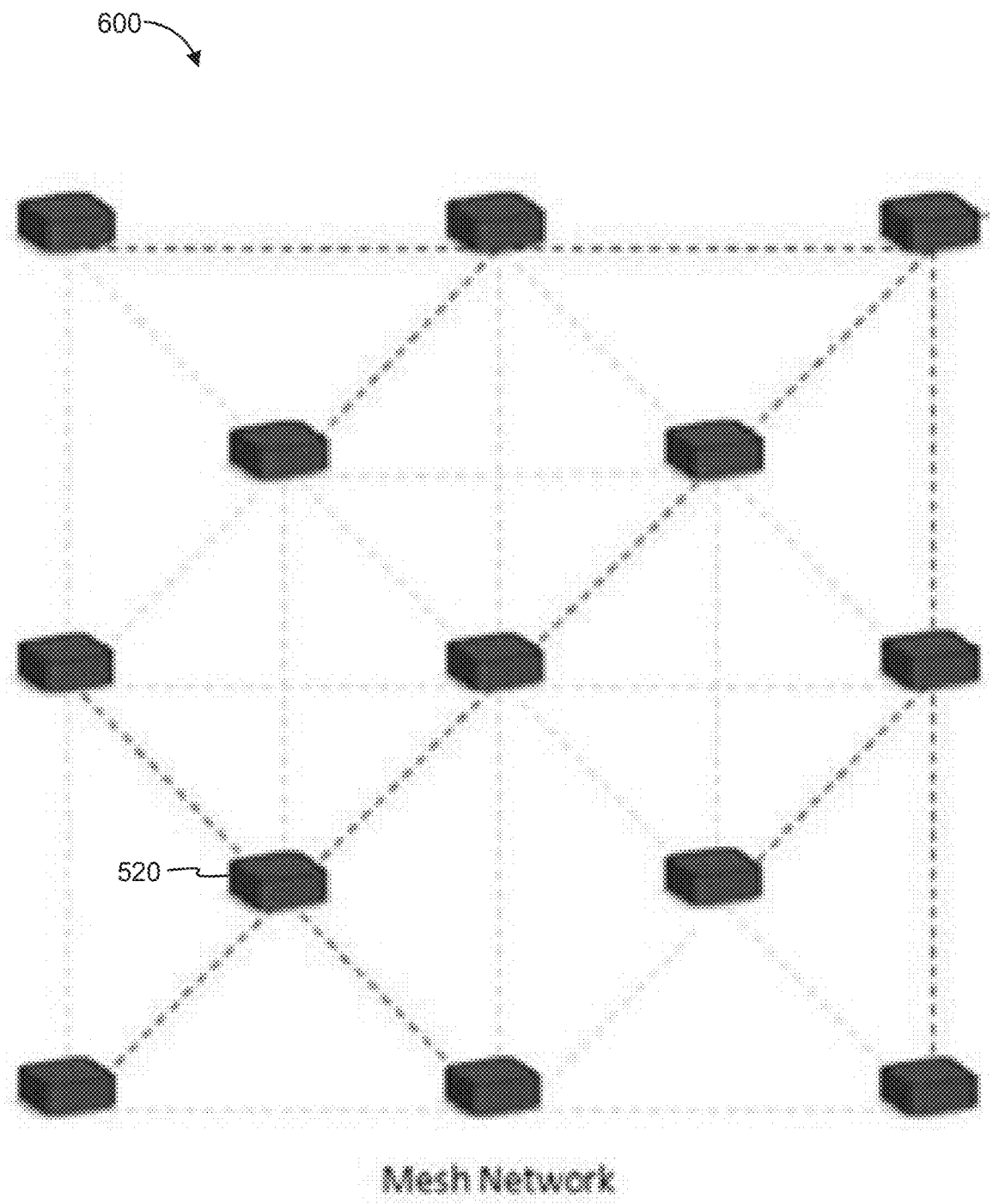
FIG. 6 illustrates a mesh network providing communication signals between sensors.

FIG. 6 illustrates a network 600 established by the sensors 520. According to one embodiment, each sensor 520 has a wireless communication device. Examples include Wi-Fi, LoRa, Zigbee, Bluetooth, or Bluetooth low-energy (BLE). In some embodiments, the sensors 520 are laid out in a mesh to improve data collection. According to one embodiment, the mesh network 600 is a distributed network with no central node. Each node connects to neighboring nodes. The nodes are mutually responsible for transferring the data of the other nodes. The nodes operate as network access points within the mesh network.

Figure 7:
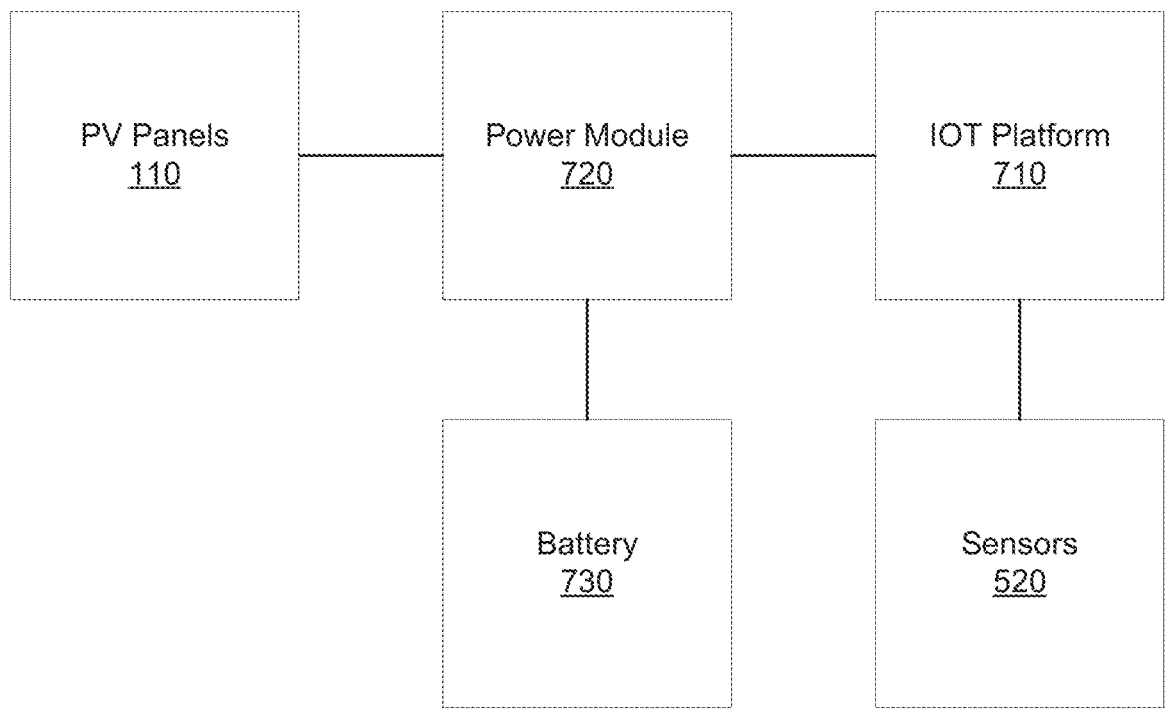
FIG. 7 illustrates a relationship between PV panels and sensors.

FIG. 7 illustrates a relationship between the sensors 520 and the PV panels 110. The sensors 520 communicate with an IoT Platform 710, according to one embodiment. The IoT Platform 710 determines what actions the PV panels 110 should take and then communicates that information to the PV panels 110 through the Power Module 720. The power module 720 is powered by a battery 730. The IoT platform provides sensor data acquisition, data analytics, and a wireless network.

Data collected by the positional sensors and other sensors can be used to predict when the PV panels should be stowed. An artificial intelligence computer model can model PV panel behavior under different wind loads and then predict at which wind loads the PV panels should be stowed to avoid damage and when the PV panels should be left in the operating state despite environmental conditions to continue to collect solar energy. The PV system can either be in a full operating state where energy yield is maximized or a reduced operating state where there is a balance between wind load mitigation and energy production. Similarly, the data analyzed can be used to predict the cause of a failure after it has occurred. The data may indicate that the failure occurred because the installation was malfunctioning prior to the wind event or because at a certain peak wind load from a certain direction the PV system failed.

Figure 8:
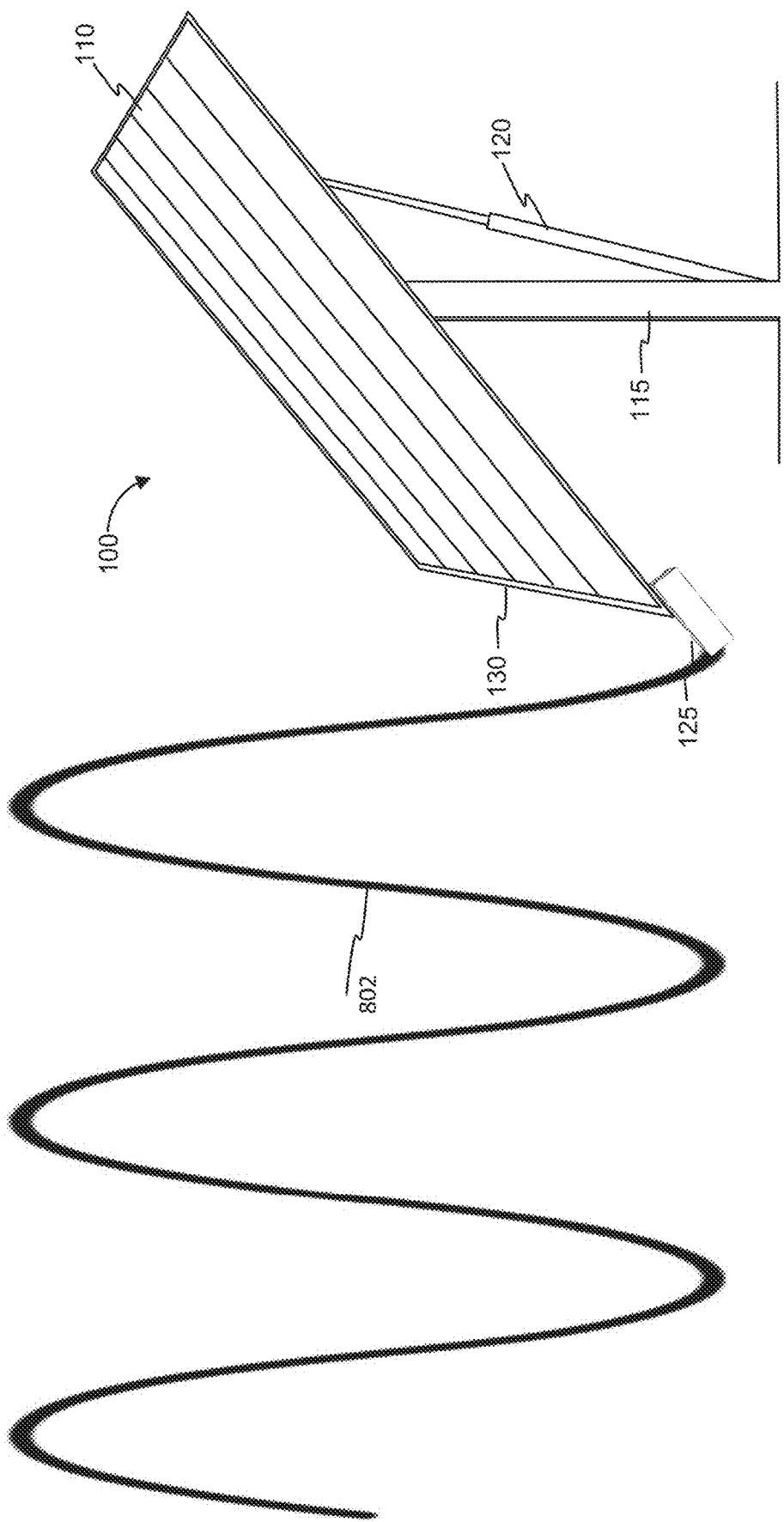
FIG. 8 illustrates a PV module amplitude and frequency.

FIG. 8 illustrates a PV module amplitude and frequency. As described elsewhere within this application, the PV module or purlin 100 includes a sensor 125 (such as a positional sensor) thereon. The sensor 125 tracks positional data (e.g., acceleration, incline angle, etc.). As the position data is collected over time, the data creates a waveform 802. The waveform 802 includes a frequency, an amplitude, and a twist deviation. The use of the term "waveform" herein refers to positional data over time and is shorthand to describe the detected deflection of a flexible PV system experiencing environmental conditions (also referred to as weather conditions). Such deflection refers to motion or position of the flexible PV system as a result of the environmental conditions. The term "waveform" is not to be read as specifically implying there must be an oscillation motion—a given waveform 802 may appear merely as a twist position and/or deviation therefrom (e.g., at weather condition X, twist Y is expected, and twist Z is observed). As such, a deflection of a flexible PV system described by a waveform may be represented by an oscillation motion, a twist position and/or deviation, or both.

The waveform 802 is generated for each sensor 125 across the PV array. A given configuration of a solar tracker in a given solar project will have a baseline response to weather that is modeled by the waveform 802. Differing baselines exist for different weather conditions and weather events therein. Knowledge of the present weather conditions at a site in combination with a baseline waveform 802 enable diagnosis of potential issues being experienced by a given PV module or set of PV modules (e.g., row, group, region, etc.).

In some embodiments, the present weather conditions are determined in real-time based on observed waveforms 802 across all or a portion of a PV array. For instance, mapping peak amplitudes of the waveforms as timestamped enables generation of a wind map. Peak amplitudes between any two PV modules 100 including sensors 125 indicates the speed of the wind between those two PV modules 100 by comparison of the timestamps of the peak amplitude and the known distance between the PV modules.

In some embodiments, sensors 125 across all or a portion of a PV array are used to diagnose potential issues being experienced by a given PV module 100 or set of PV modules 100. An observed waveform 802 for each sensor 125 across the PV array is generated in real-time as it experiences weather conditions. These observed waveforms 802 across all or a portion of a PV array are continually compared to one another. The comparison requires an assumption that some percentage of the PV modules 100 are operating under a common baseline condition (e.g., are operating without failure). In some embodiments, it is assumed that a majority of the PV modules 100 are operating under a baseline condition and the observed waveforms 802 associated with these PV modules 100 represents the baseline condition. In these embodiments, the baseline condition is constructed via distance between each waveform where those waveforms that exceed a threshold distance from one another do not contribute to the baseline condition and are outliers. Distance is measured by correlation of measured data. The baseline is then a range of contemporaneous measured data that form the outer bounds of all members of the baseline condition group. Embodiments of outliers exceeding the baseline condition are based on any of: correlation below a threshold of baseline condition, timeframes of a predetermined threshold length with measurements that exceed the baseline condition, measured distances that fall outside a predetermined number of standard deviations from the mean of the baseline condition, or anomalous data detected by a trained artificial intelligence model. These embodiment operate on a basis of peer comparison using contemporaneous measurements to identify failure conditions in outlier systems.

In other embodiments, a baseline condition is identified once a pre-determined threshold percentage of similar observed waveforms 802 is detected across the PV modules 100 in question. Once the pre-determined threshold percentage is met, the similar observed waveforms 802 are used to represent the baseline condition.

Upon detection that an observed waveform 802 of a given PV module 100 operating at the baseline condition suddenly shifts to a deviation from the baseline condition, a flag is generated in a data platform. The flag generated in the data platform predicts a failure mode of the PV module 100 based on the observed deviation from the baseline condition. Such a flag enables accurate reporting of PV module failures for insurance purposes. In some embodiments, the flag generated includes sufficient description of the failure mode to identify the predicted maintenance necessary to repair the PV module 100 in failure mode. generated in a data platform enable accurate reporting of PV module failures for insurance purposes. In other embodiments, the flag generated is included in a report (as described with respect to FIG. 11 below).

Table 1 below discusses failure mode interpretations of various deviances of a presently observed waveform from a baseline waveform. The deviations described below are intended as illustrative and not limiting.

TABLE 1

| Failure Mode | Frequency | Amplitude | Twist Deviation | Note |
| --- | --- | --- | --- | --- |
| Baseline Condition/Normal Operation | Normal | Normal | Normal | Frequency and amplitude are roughly constant for a given row location, site wind velocity, and/or temperature. Twist deviation shows how closely the rows track relative to each other (many sensors show if one row is 10 degrees while others are all 5 degrees, probably under zero wind). |

TABLE 1-continued

| Failure Mode | Frequency | Amplitude | Twist Deviation | Note |
|---|---|---|---|---|
| Loosened Connection Anywhere in Driveline | Lower | Higher | Normal | Torque tube torsional spring constant lowered or not effective for a certain free play region due to loose hardware. This can be an O&M flag for inspection/repair before significant failure in most cases. |
| Failed Damper (lower damping) | Higher | Higher | Normal | Due to failed damper oil ring seal, damper connection hardware failure, or anything that takes damper out of the system. |
| Failed Damper (higher damping) | Lower | Lower | Abnormal | System may have a stuck damper or too high friction in bushings or elsewhere in the system. |
| Tracker Stuck in Snow | N/A | N/A | Abnormal | (Not measured during wind.) Sensors can show if wing is not tracking like the rest of the system and flag to stop tracking before damage. |
| Unbalanced Snow or Ice | N/A | N/A | Abnormal | Same as above. |
| Modules Fall Off Row | Higher | Lower | Normal | Lower moment of inertia increases frequency and lower forces on row gives lower amplitude. |
| Structural Failure (except damper) | Lower | Higher | Abnormal | Many variations, but any significant structural failure will show abnormal readings on all three metrics. Timestamping time of failure and local wind speed is main value. Failure mode can be determined after the fact. |
| Stall Flutter/ Torsional Galloping | N/A | Higher | Normal | Baseline on frequency not relevant as this is more a metric that tracker company should be designing within. Cyclical twisting beyond design calculations means system needs significant retrofits before failures (hopefully). |
| Divergence | N/A | N/A | Abnormal | Not necessarily a cyclical behavior. Another metric that tracker company should be designing within. Twisting beyond spec requires retrofits to prevent later failures. |

Table 1 describes deviations as categories in reference to a baseline waveform 802; however, in some embodiments, the detected deviations are more granular. For example, rather than simply having "higher" than baseline frequency, the frequency is measured at 137% baseline. More granular data enables training of machine learning models (e.g., neural networks or hidden Markov models) that more precisely diagnose failure modes. In some embodiments, an observed waveform 802 is provided to a machine learning model as input in order to receive a failure mode diagnosis as output of the model.

Observing a given predicted failure mode across multiple PV modules 100 increases confidence in a diagnosis, especially where the failure mode is one likely experienced by multiple modules simultaneously (e.g., snowfall).

Figure 9:
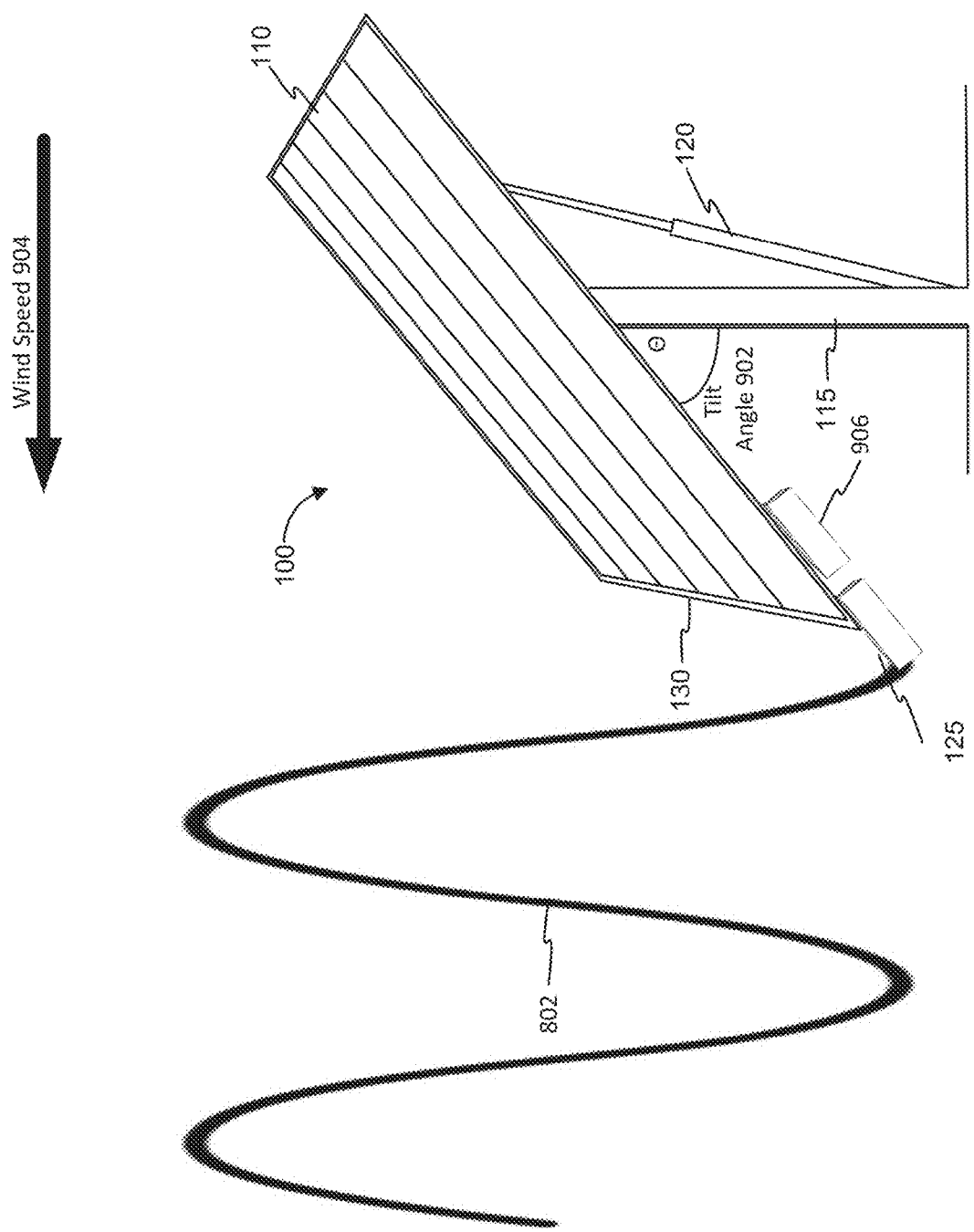
FIG. 9 illustrates a PV array with a set of varied sensors.

FIG. 9 illustrates a PV array with a set of varied sensors. In FIG. 8, a single sensor 125 is employed to illustrate the experiences of a given PV array. In FIG. 9, additional data points are included to further describe the array. A tilt angle sensor 902, a pressure sensor 906, and a wind speed detector (e.g., an anemometer) 904 are located throughout the array. In a similar manner that sensors that measure amplitude and/or frequency are baselined against wind velocity and other metrics, the pressure sensors are baselined to characterize the local pressure in similar circumstances.

In some embodiments, the pressure tap is part of a distributed sensor network that is correlated to tracker row tilt angle, site wind speed, and site wind approach direction. Employing a three-variable map (generated by measuring the pressure tap over time versus known wind speed/direction and tilt angle), a model generates a wind map at a more granular level.

Use of a multi-sensor suite reduces reliance on the motion sensor 125 by itself. Both the characterization of the currently observed weather and the nuance of deviation from baseline is more data rich.

Figure 10:
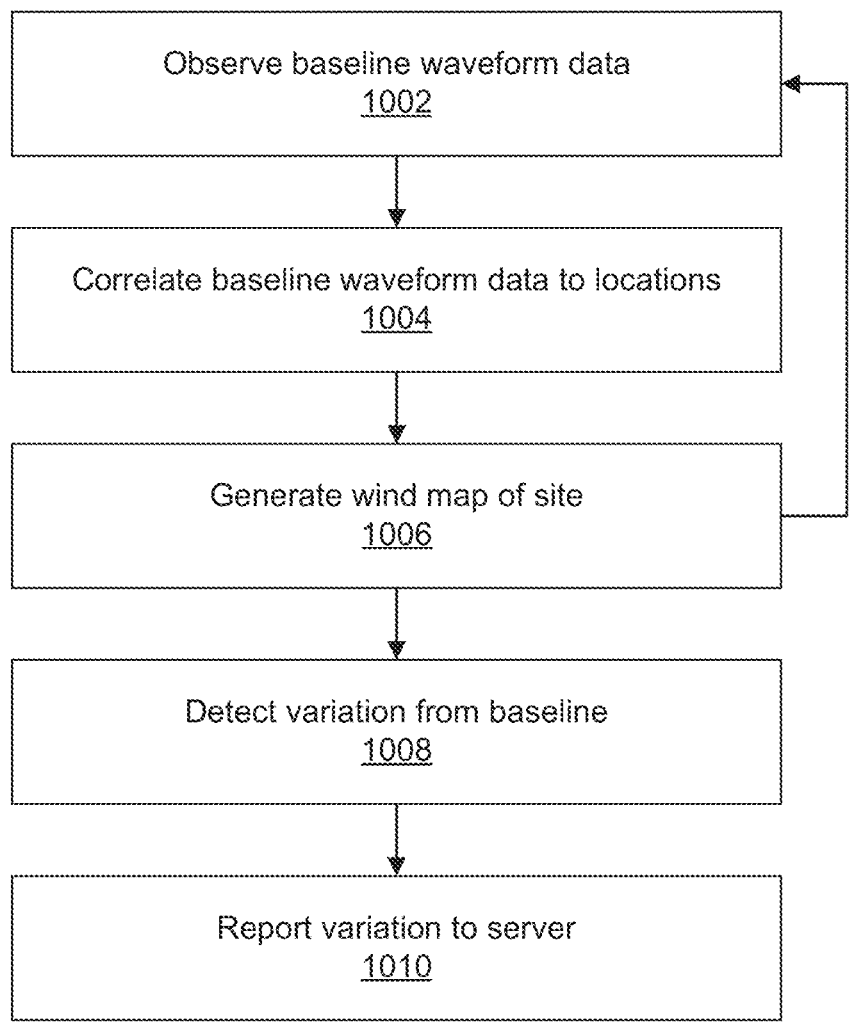
FIG. 10 is a flowchart illustrating a generation of a baseline row behavior.

FIG. 10 is a flowchart illustrating a generation of a baseline row behavior. At step 1002, baselines are taken from available sensors including a waveform of motion during wind events. PV arrays are designed to mitigate weather effects at certain ratings, and when those effects are experienced by the project, baselines are recorded. A number of baselines are maintained for a number of different wind events. Different wind speeds will have different resulting baseline waveforms.

In step 1004, the baseline data is correlated by location. Each sensor has a known location within the array relative to one another. Those locations enable visualization of a baseline that is greater than a single point in the array. In larger arrays, the site-wide view of a baseline may have greater variability due to the topography of the site, which may have significant variations between different portions of the array.

At step 1006, the sensors present at the PV array site generate a wind map that characterizes the weather experienced by the PV array. The characterization of the weather occurs both while a baseline is being formed and subsequently during a typical observation period. Baselines are continuously refined over the life of the sensor system. In step 1008, a given sensor or set of sensors detect variation from the baseline. In step 1010, the variations are reported to a central server for processing.

Figure 11:
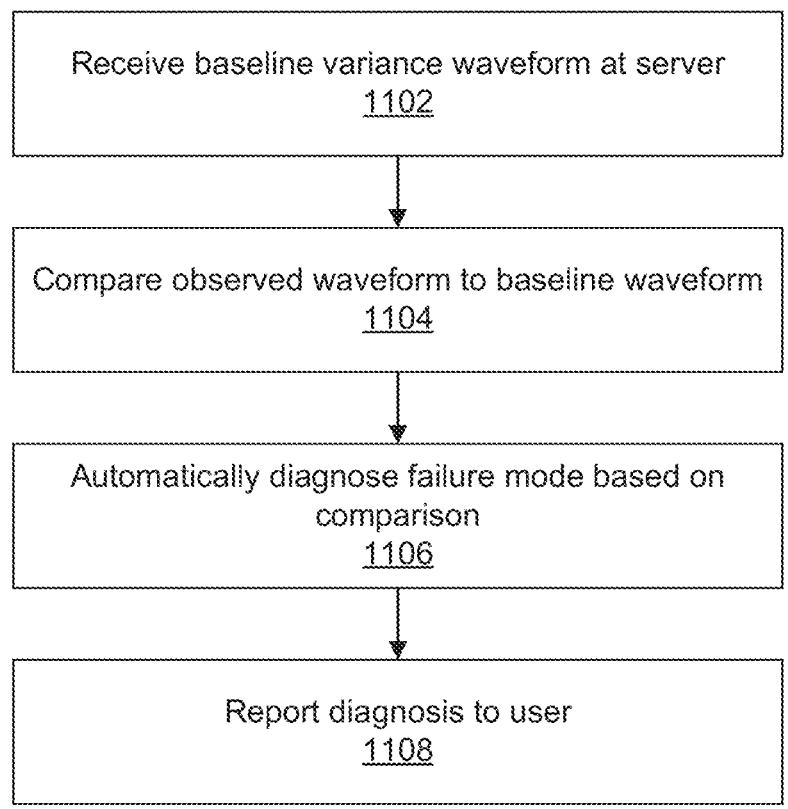
FIG. 11 is a flowchart illustrating failure mode categorization.

FIG. 11 is a flowchart illustrating failure mode categorization. In step 1102, a central server receives sensor data including a waveform that deviates from a baseline waveform. The waveform including the deviation is timestamped. In step 1104, the server compares the observed waveform to the baseline waveform and defines the variance. Across different embodiments, the comparison varies. In some embodiments, the comparison is an absolute comparison (e.g., whether a given characteristic is higher, lower, within threshold of normal, or undefined). In some embodiments, the absolute comparison includes additional tiers (e.g., higher, much higher, significantly higher, etc.). In some embodiments, the comparison fills out a data structure that describes variances relative to the baseline in precise values. In some embodiments, the comparison is performed by submitting the observed waveform to a machine learning model.

In step 1106, however the comparison is performed, the results of the comparison are employed to diagnose a failure mode of the measured tracker row, PV module, or set of PV modules. In some embodiments, the diagnosis applies a heuristic or a lookup table to diagnose. In some embodiments, a machine learning model characterizes the variance and identifies a failure mode based on preexisting training related to previously observed failure modes. In some embodiments of a machine learning model, variations from baseline are categorized into observable states (e.g., waveform variances from baseline) as correlated with hidden states (e.g., failure modes). The observable states as connected to the hidden states are verified through implementation of a Viterbi algorithm.

In step 1108, the diagnosed failure mode is timestamped and connected to a report output to an O&M user or insurance agent. The report includes a description of which sections of the array failed, how they failed, when they failed, and the conditions in which the failure occurred. PV power plant sites have anemometers in addition to an array of motion sensors. The combination of sensors increases the ability to correlate wind data with sensed movement. A wind map of the entire site for a time interval is derived from the data collected from the array of motion sensors. This wind map provides data to correlate failures with the accelerometer data and time of failure.

Figure 12:
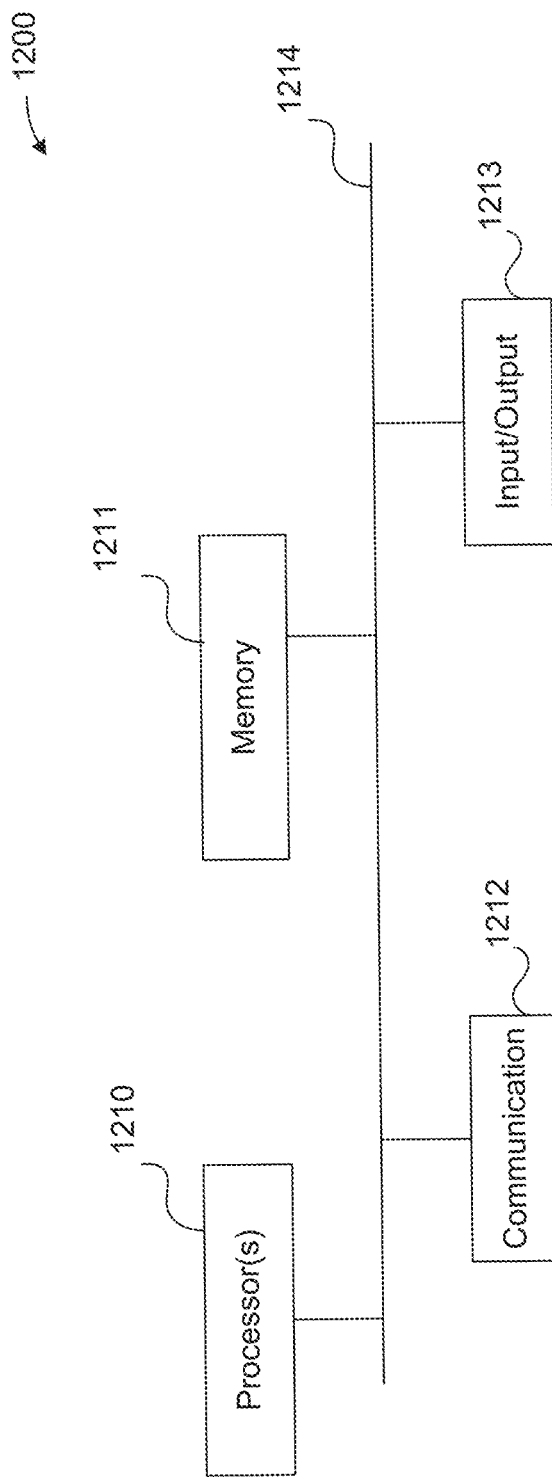
FIG. 12 illustrates an exemplary computing environment.

FIG. 12 is a block diagram of a computer system as may be used to implement features of the disclosed embodiments. The computer system 1200 may be used to implement any of the entities, components or services depicted in the examples of the foregoing figures (and any other components described in this specification). The computer system 1200 may include one or more central processing units ("processors") 1205, memory 1210, input/output devices 1225 (e.g., keyboard and pointing devices, display devices), storage devices 1220 (e.g., disk drives), and network adapters 1230 (e.g., network interfaces) that are connected to an interconnect 1215. The interconnect 1215 is illustrated as an abstraction that represents any one or more separate physical buses, point-to-point connections, or both connected by appropriate bridges, adapters, or controllers. The interconnect 1215, therefore, may include, for example, a system bus, a Peripheral Component Interconnect (PCI) bus, or PCI-Express bus, a HyperTransport or industry standard architecture (ISA) bus, a small computer system interface (SCSI) bus, a universal serial bus (USB), IIC (I2C) bus, or an Institute of Electrical and Electronics Components (IEEE) standard 1394 bus, also called "Firewire."

The memory 1210 and storage devices 1220 are computer-readable storage media that may store instructions that implement at least portions of the described embodiments. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can include computer-readable storage media (e.g., "non-transitory" media) and computer-readable transmission media.

The instructions stored in memory 1210 can be implemented as software and/or firmware to program the processor(s) 1205 to carry out actions described above. In some embodiments, such software or firmware may be initially provided to the computer system 1200 by downloading it from a remote system through the computer system 1200 (e.g., via network adapter 1230).

The embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

From the foregoing, it will be appreciated that specific embodiments of the invention have been described herein for purposes of illustration but that various modifications may be made without deviating from the scope of the invention. Accordingly, the invention is not limited except as by the appended claims.

We claim:

1. A method for diagnosing failure modes of a solar tracker system, the method comprising:
   identifying, by a server, a first weather condition experienced by a photovoltaic (PV) panel, the first weather condition characterized by weather events that cause high-stress within designed limits of the solar tracker system;
   obtaining, by the server, a baseline waveform, the baseline waveform corresponds to a PV panel deflection response to the first weather condition, and wherein the baseline waveform indicates positional data of the PV panel;
   measuring, by a first sensor of the PV panel, an observed waveform of the PV panel, the observed waveform corresponds to a PV panel deflection response to a second weather condition, wherein the second weather condition corresponds to the first weather condition occurring at a subsequent time, wherein the observed waveform indicates positional data of the PV panel;
   receiving, from the first sensor, the observed waveform at the server;
   comparing, by the server, the observed waveform to the baseline waveform;
   determining a deviation between the observed waveform and the baseline waveform based on comparing the observed waveform to the baseline waveform;
   detecting a failure mode of the PV panel based on the deviation between the observed waveform and the baseline waveform; and
   generating a report of the failure mode.

2. The method of claim 1, wherein the positional data comprises:
   an acceleration of the PV panel over time; or
   an incline angle of the PV panel over time.

3. The method of claim 1, wherein the observed waveform includes a frequency, an amplitude, and/or a twist deviation of the PV panel.

4. The method of claim 1, further comprising:
determining the second weather condition of the PV panel based on one or more additional observed waveforms corresponding to additional PV panels of the solar tracker system.

5. The method of claim 1, wherein detecting the failure mode includes:
a heuristic;
a lookup table; and/or
a characterization of the deviation by a machine learning model.

6. The method of claim 1, wherein the report of the failure mode includes:
a description of how the PV panel failed;
a time of PV panel failure; or
a description of a weather condition in which the PV panel failed.

7. The method of claim 1, wherein the server obtains the baseline waveform further comprising:
measuring, by the first sensor of the PV panel, a plurality of baseline waveforms during a plurality of weather conditions, wherein the plurality of baseline waveforms are measured when the PV panel is not in a failure mode;
correlating the plurality of baseline waveforms with a location of the first sensor; and
sending the plurality of baseline waveforms, the plurality of weather conditions, and the location of the first sensor to the server.

8. The method of claim 1, further comprising:
obtaining, by the server, additional baseline data, the additional baseline data corresponds to the first weather condition;
measuring, by a second sensor of the PV panel, additional data of the PV panel, the additional data corresponds to the PV panel deflection response to the second weather condition;
receiving, from the second sensor, the additional data at the server;
comparing, by the server, the additional data to the additional baseline data;
determining a deviation between the additional data and the additional baseline data based on comparing the additional data to the additional baseline data; and
detecting a failure mode of the PV panel based on the deviation between the additional data and the additional baseline data.

9. The method of claim 8, wherein the second sensor is a tilt angle sensor, a pressure sensor, or an anemometer.

10. The method of claim 8, wherein the server obtains the additional baseline data further comprising:
measuring, by the second sensor of the PV panel, a plurality of additional baseline data during a plurality of weather conditions, wherein the plurality of additional baseline data is measured when the PV panel is not in a failure mode;
correlating the plurality of additional baseline data with a location of the second sensor; and
sending the plurality of additional baseline data, the plurality of weather conditions, and the location of the second sensor to the server.

11. A system for diagnosing failure modes of a solar tracker system comprising:
a plurality of sensors of a solar tracker row, the plurality of sensors configured to measure a plurality of observed waveforms experienced across the solar tracker row corresponding to positional data of the solar tracker row; and
a central computing system configured to:
identify a baseline waveform, the baseline waveform corresponds to a solar tracker row deflection response to a first weather condition experienced by the solar tracker row, the first weather condition characterized by weather events that cause high-stress within designed limits of the solar tracker system, and wherein the baseline waveform indicates positional data of the solar tracker row;
receive, from the plurality of sensors, the plurality of observed waveforms, the plurality of observed waveforms correspond to a solar tracker row deflection response to a second weather condition, wherein the second weather condition corresponds to the first weather condition occurring at a subsequent time;
compare the plurality of observed waveforms to the baseline waveform;
determine one or more deviations between the plurality of observed waveforms and the baseline waveform based on comparing the plurality of observed waveforms to the baseline waveform;
detect one or more failure modes of the solar tracker row based on the one or more deviations between the plurality of observed waveforms and the baseline waveform; and
generate a report of the one or more failure modes.

12. The system of claim 11, wherein the positional data comprises:
an acceleration of the solar tracker row over time; or
an incline angle of the solar tracker row over time.

13. The system of claim 11, wherein the plurality of observed waveforms includes a frequency, an amplitude, and/or a twist deviation of the solar tracker row.

14. The system of claim 11, wherein the report of the one or more failure modes includes:
a description of how the solar tracker row failed;
a time of solar tracker row failure;
a PV panel of the solar tracker row that failed; or
a description of a weather condition in which the solar tracker row failed.

15. The system of claim 11, configured to:
obtain a plurality of additional baseline data of the solar tracker row, the plurality of additional baseline data corresponds to the first weather condition,
wherein the plurality of additional baseline data include a tilt angle of the solar tracker row, a pressure experienced by the solar tracker row, or a wind speed experienced by the solar tracker row;
measure, by the plurality of sensors, a plurality of additional data of the solar tracker row, the plurality of additional data corresponds to the solar tracker row deflection response to the second weather condition,
wherein the plurality of additional data include a tilt angle of the solar tracker row, a pressure experienced by the solar tracker row, or a wind speed experienced by the solar tracker row;
receive, from the plurality of sensors, the plurality of additional data;
compare the plurality of additional data to the plurality of additional baseline data;
determine one or more deviations between the plurality of additional data and the plurality of additional baseline data based on comparing the plurality of additional data to the plurality of additional baseline data; and detect a failure mode of the solar tracker row based on the one or more deviations between the plurality of additional data and the plurality of additional baseline data.

16. The system of claim 15, further configured to:
measure, by the plurality of sensors of the solar tracker row, the plurality of additional baseline data during a plurality of weather conditions, wherein the plurality of additional baseline data is measured when the solar tracker row is not in a failure mode;
correlate the plurality of additional baseline data with locations of the plurality of sensors; and
store the plurality of additional baseline data, the plurality of weather conditions, and the locations of the plurality of sensors.

17. A method for diagnosing failure modes of a solar tracker system, the method comprising:
identifying, by a server, a first wind velocity experienced by a photovoltaic (PV) panel, the first wind velocity characterized by velocities that cause high-stress within designed limits of the solar tracker system;
obtaining, by the server, a baseline waveform, the baseline waveform corresponds to a PV panel deflection response to the first wind velocity, and wherein the baseline waveform indicates positional data of the PV panel;
measuring, by a first sensor of the PV panel, an observed waveform of the PV panel, the observed waveform corresponds to a PV panel deflection response to a second wind velocity, wherein the second wind velocity corresponds to the first wind velocity occurring at a subsequent time, wherein the observed waveform indicates positional data of the PV panel;
receiving, from the first sensor, the observed waveform at the server;
comparing, by the server, the observed waveform to the baseline waveform;
determining a deviation between the observed waveform and the baseline waveform based on comparing the observed waveform to the baseline waveform;
detecting a failure mode of the PV panel based on the deviation between the observed waveform and the baseline waveform; and
generating a report of the failure mode.

18. The method of claim 17, further comprising:
determining the second wind velocity of the PV panel based on one or more additional observed waveforms corresponding to additional PV panels of the solar tracker system.

19. The method of claim 17, wherein detecting the failure mode includes:
a heuristic;
a lookup table; and/or
a characterization of the deviation by a machine learning model.

20. The method of claim 17, wherein the report of the failure mode includes:
a description of how the PV panel failed;
a time of PV panel failure; or
a description of a wind velocity in which the PV panel failed.

* * * * *